Feb. 24, 1959  C. VAN DER LELY ET AL  2,874,529
ROTARY RAKING WHEEL
Filed May 13, 1955  2 Sheets-Sheet 1

INVENTORS
CORNELIS VAN DER LELY
ARY VAN DER LELY

INVENTORS
CORNELIS VAN DER LELY
ARY VAN DER LELY

United States Patent Office

2,874,529
Patented Feb. 24, 1959

2,874,529

ROTARY RAKING WHEEL

Cornelis van der Lely and Ary van der Lely, Maasland, Netherlands, assignors to C. van der Lely N. V., Maasland, Netherlands, a Dutch company Application May 13, 1955, Serial No. 508,227

Claims priority, application Netherlands June 17, 1954

10 Claims. (Cl. 56—400)

The invention relates to rake wheels or similar raking members provided with teeth and useful in side delivery rakes, turners or similar agricultural devices.

Rake wheels of this kind are generally known and have been provided with teeth distributed substantially regularly over the circumference of the rake wheel. Said rake wheels have the drawback that they deliver not only crop but stones, clods and other items as well. It is very difficult to remove these undesirable foreign objects subsequently from the crop. If these foreign objects are very hard, like stones, in various further treatments they are dangerous to subsequently used equipment such as forage harvesters, bale presses and so forth.

It is an object of the invention to overcome the above noted difficulties. According to the invention, a rake wheel is provided with a number of passages for letting the stones or similar objects through, which passages are situated between the teeth, the smallest dimension of each of said passages, measured along the ground, being considerably larger than the average distance between the points of adjacent teeth. In the preferred form, the rake wheel of the invention will take along the crop with it as well or nearly as well as a conventional rake wheel, but it will leave the foreign objects behind or move them only over a very small distance, whereas the crop which will be moved over a much larger distance, so that crop and foreign objects will be separated.

Figure 1:
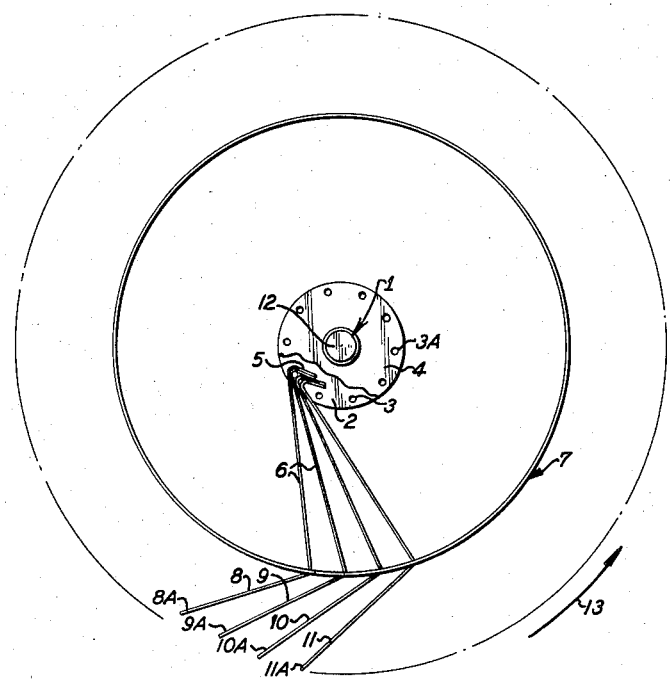
Figure 2:
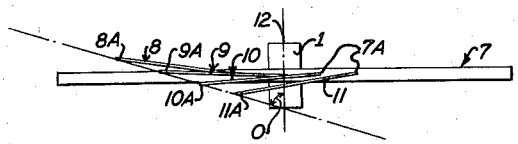
Figure 3:
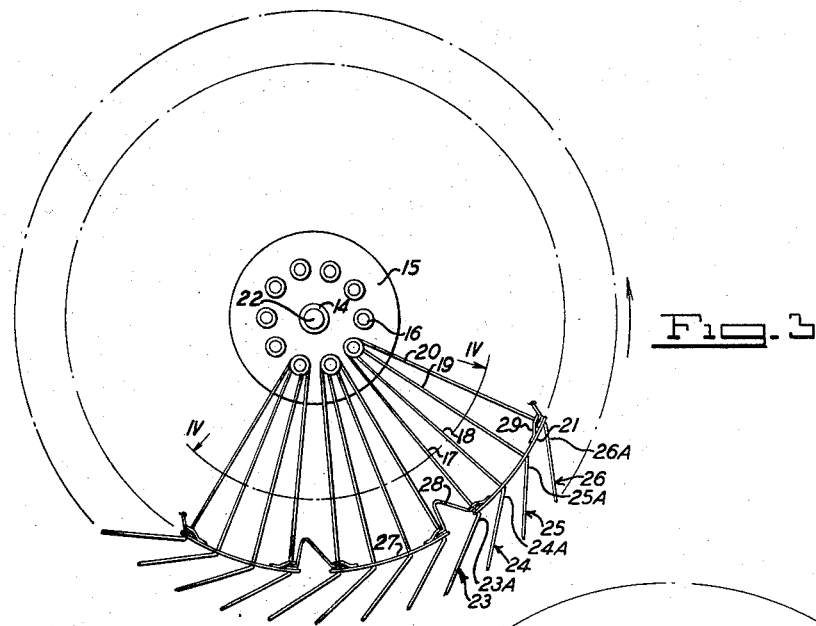
Figure 5:
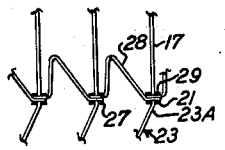
Figures 4, 7:
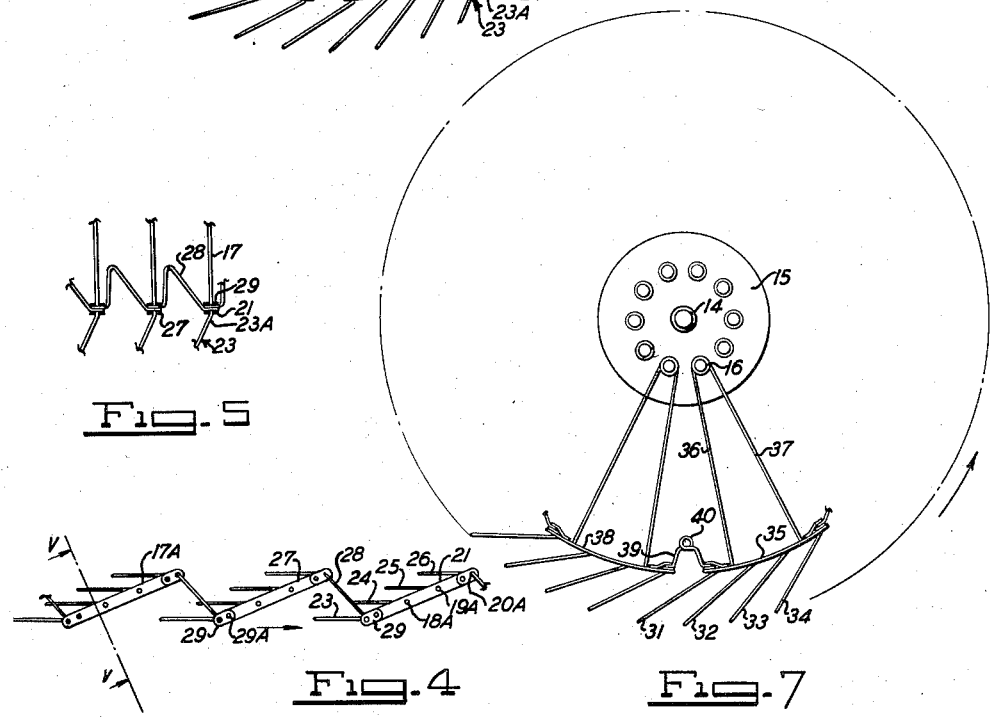
Figure 6:
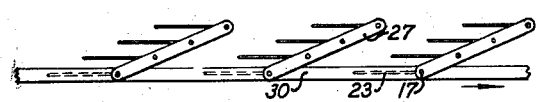

Further features and details of the invention will be hereinafter more fully described with reference to the accompanying drawings in which some preferred embodiments of the invention are illustrated by way of example and in which:

Fig. 1 is a front elevational view of a wheel in accordance with a first embodiment of the invention in which view only some teeth are represented, Fig. 2 is a plan view of the wheel shown in Figure 1, Fig. 3 is a front elevational view of a second embodiment of the invention, Fig. 4 is a view according to line IV—IV in Fig. 3, Fig. 5 is a sectional view according to line V—V in Fig. 4, Fig. 6 illustrates a third embodiment of the invention, and Fig. 7 is a front elevational view of a part of a rake wheel according to a fourth embodiment of the invention.

According to Figs. 1 and 2, a rake wheel has a rotation means R including a hub or hub portion 1 on which is welded a circular flat disc 2 with an opening 2A for the hub. At the circumference, said disc 2 is provided with ten holes 3. A loose disc 4 (partially omitted in the drawing) on the disc 2 and provided with holes 3A corresponding to the holes 2A in said disc can be drawn against the disc 2 by means of ten bolts to clamp the bent extremities 5 of a number (for example, forty) of spokes 6. The rake wheel further comprises a support means or cylindric rim or rim portion 7 which is provided with forty regularly spaced apertures or holes 7A through each of which a spoke is inserted. Outside the rim 7, the spokes are bent and they extend outwardly from the rotation means R as teeth of which teeth 8, 9, 10 and 11, are represented in the drawing. The spokes 6 are not radially disposed and each makes an angle of well over 90° with the corresponding tooth; the rim 7 remains centered with regard to the hub 1 by means of the bends in the steel wires, which bends are located near the rim and which steel wires each form a spoke as well as a tooth.

The forty teeth of the rake wheel are divided into ten groups or rows of four. In principle, all groups are identical, but the teeth of each group differ. As appears from Fig. 2, the tooth 8 does not lie in the plane of drawing in Fig. 1, but said tooth extends to one side of said plane, whereas the tooth 11 extends to the other side. The teeth 9 and 10 occupy intermediate positions and the points 8A—11A of the teeth 8—11 are situated nearly in a straight line. This line intersects the center line 12 of the rake wheel at an acute angle 0. The next group of four spokes has an identical arrangement, but is arranged at an angle of 36°, so that between the extremities of the teeth of two adjacent groups a passage exists through which stones and the like can pass easily, especially when the rake wheel is moved in such a position over the field that the passages at the lower edge of the wheel have about the same direction as in which the wheel is moved forward. When moving in such a way, the wheel makes a movement which is partly a rolling one and partly a sliding one with regard to the ground; while rolling, the wheel rotates around the center line or axis of rotation 12 in accordance with the arrow 13 in Fig. 1, so that the crop can fall readily from the teeth as they leave the ground.

Assuming that the rake wheel is moved in such a way that the crop is accumulated at the front side of the rake wheel in Fig. 1, it is advantageous that the distance from the point of the foremost tooth 8 to the axle 12 be somewhat smaller than the distance from the point of the hindmost tooth 11 to the axle 12. It is most favorable to construct the teeth 9 and 10 in such a way that the points 8A—11A of the teeth 8, 9, 10 and 11 lie at increasing distances from the axle 12. The tooth of the adjacent group situated near the tooth 8 and corresponding to the tooth 11 has its point at a considerably greater distance from the axle 12 than the point of the tooth 8. During operation of the rake wheel, this tooth corresponding to the tooth 11 is thereby bent further backwards than the tooth 8 so that the passage will be widened. Preferably, the point of the tooth corresponding to the tooth 11 in one group lies at an equal distance from the axle 12 as the point of the tooth 11 in another group.

The consequence of this construction is that the rake wheel rests chiefly with its hindmost teeth 10 and 11 on the ground, whereas the foremost teeth 8 and 9 do not touch the ground or, at most, rest on the ground with a slight pressure when in the lowermost position. The teeth 8 and 9 can therefore easily give way to admit a stone through a passage even when the stone is a little broader than the passage. When once a stone is in a passage, it cannot be carried along by the wheel, for the teeth limiting the passage will soon leave the ground, so that such stones are left behind the wheel after being removed over no more than a small distance.

Furthermore, it is very favorable for a good raking action that the teeth, which are the foremost or the hindmost ones, direct their points somewhat forward or backward, especially when the points of the foremost teeth have a smaller distance to the center line of the wheel, as was described. The position of the foremost teeth is very favorable for contacting the greater part of the crop, the position of the hindmost teeth which do not need to contact as much crop, being favorable to let stones through and also being useful to contact a small quantity of crop. It is preferred that the foremost teeth extend forward or the hindmost teeth extend backward.

According to Figs. 3–5, a second embodiment of the invention has a hub 14 provided with a circular flat disc 15 through which ten bolts 16 are arranged on each of which two U-shaped bent steel wires are clamped. The four limbs of two of these steel wires clamped by means of a bolt constitute a group of four spokes 17—20 of the rake wheel. The spokes of a group extend through four holes 17A—20A in a bent strip 21, the points 21A and 21B of which have substantially equal distances to the center line 22 of the rake wheel. The strip 21 serves as a connecting member between the feet 23—26A of the teeth. The bent prolongations 23—26 of the spokes 17—20 extend beyond the strip 21 and constitute the teeth of the raking wheel. The bends prevent the strip 21 from moving away from the hub 14. Particular provisions may be made to prevent the strip 21 from approaching the hub 14. The spokes 17—20 are bent in such a way that when the wheel is in an untensioned condition, the strips 21 make an acute angle with the plane of the wheel. As is shown by Figs. 4 and 5, in a rake wheel of this construction, wide passages for the stones are provided, said passages having a considerable width adjacent the strips.

Preferably, adjacent extremities of strips belonging to adjacent groups of teeth, as the arcuate segments or strips 21 and 27, are interconnected by a resilient coupling member 28 composed of a steel wire being centrally bent and the ends of which are bent in order to constitute eyes. The coupling member 28 is connected to the strip 21 by causing the eye-shaped extremity thereof to grip the spoke 17, a small strip 29 which is by rivets 29A attached to the strip 21 preventing the removal of the eye from the strip 21. The fastening of the other end of the coupling member is effected in a similar way. In the construction represented in Figs. 3–5, the coupling members 28 prevent the strips from leaving the hub.

Figs. 3 and 5 show clearly that the bent shape of the coupling member 28 not only enhances its resiliency, but also enlarges the section of the resulting passages. Though not shown in Fig. 3, the teeth located at the front of the rake wheel may have a shorter distance between their respective points and the center line of the wheel.

According to Fig. 6, it is possible to deviate from the construction according to Fig. 3 to such an extent that, at the front of the rake wheel, a cylindrical rim 30 is provided fixing the relative positions of the feet of the foremost teeth of the groups. This fixation is provided by leading a spoke 17 constituting the prolongation of, for example, a foremost tooth 23 through a hole in the rim 30, said spoke being led at the same time through a hole in the strip 21 in question. These holes have sufficient play so that the part of the spoke 17 adjacent to the tooth 23 is freely rotatable in the strip 21 and the rim 30. In principle, the strip 21 is freely rotatable around the spoke 17, but a bending of the other spokes will resist this elastically. If the coupling members 28 in Fig. 3 are maintained, which is not necessary, these members will also elastically resist torsion in the strips. It must be insured that the point of rotation of the strips remains in close proximity to the rim. Preferably, the rim 23 is provided at the front of the rake wheel, i. e., the side coming into contact with the crop. In this case the rim is advantageously very active in contacting the crop. Still more important is, however, the fact that when the teeth are subject to a great resistance the strips turn away from the rim due to which the passage for foreign bodies is widened.

The rake wheel according to Fig. 7 is another modification of the rake wheel according to Fig. 3. In this embodiment, a hub 14, a disc 15 and bolts 16 are also provided as well as groups of teeth. However, the teeth of a group, e. g., the teeth 31—34, are immovably implanted on a connecting member in the shape of a strip 35. Each of the connecting members are connected to the hub of the wheel by means of two spokes bent from a single piece of steel wire and clamped to the disc 15 by means of a bolt 16. In particular, the strip 35 is carried by the spokes 36 and 37 the extremities of which are immovably connected to the strip 35. The strips 35 and 38 are placed in relation to each other in the same way as the strips 21 and 27 in the devices according to Figs. 3–5. The adjacent extremities of adjacent strips are also resiliently interconnected by means of coupling members 39 corresponding to the coupling members 28 of Figs. 3–5. However, the coupling members 39 have centrally a part 40 wound in the shape of a helical line which part 40 increases the elasticity of the coupling member without making the passage smaller.

It is evident that in the embodiments according to Figs. 3–7 having the foremost teeth directed forward and/or the hindmost teeth directed backward is advantageous.

The embodiments of rake wheels according to the invention have substantial openings for passing foreign objects. Considered from an axial direction, however, the distribution of the teeth over the circumference of the wheel is regular so that the distance between adjacent teeth of adjacent groups does not differ essentially from the distances between conventional teeth.

Reviewing the different embodiments of the invention as shown in Figures 1–7, it will be seen that various of the features of the invention are shared in common.

For example, the raking members are substantially planar and their respective teeth considered in side view (see Figs. 1, 3 and 7) or projected at a plane P perpendicular to the associated axis of rotation (see for example Fig. 2) of each raking member are equally spaced. Thus, corresponding portions of the various teeth such as, for example, the outer extremities E1, E2 and E3 (Fig. 1) are equally spaced by distances S1 and S2 considered at plane P which is the plane of the drawing in Fig. 1.

Moreover, the teeth of the different embodiments are arranged in groups such as, for example, the groups G1 and G2 in Fig. 2, these groups defining passages A as most clearly seen in Fig. 4 the minimum widths W of which are greater than the average distances D between the outer extremities of adjacent teeth. This distance D is, in some embodiments, a constant distance (Figs. 4 and 6) but other embodiments (see Fig. 2) varies so that comparison is made with the average.

Further, the different groups G of teeth each include at least three teeth so as to allow a side delivery function due to the presentation of a substantial and effective working surface or plane defined by the teeth.

This latter function is a part of the operation contemplated for raking members of the invention which moreover includes, by virtue of the even distribution of the teeth, provision for a homogeneous processing of material on the ground in a direction perpendicular to the planes of the raking members. In other words, the equal spacing (see S1 and S2) of the teeth considered at the plane of each raking member enables the raking member to receive material along a direction perpendicular to the plane of the raking member without presenting gaps through which the material can drift, the passages P providing for the escape of rocks and the like.

The invention further contemplates that at least one tooth in one group overlaps at least one tooth in the next adjacent group such as by a distance L (see Figs.

6 and 7). This distance of overlap enables the positive definition of the passages P for the passing of rocks and so forth while at the same time insuring the engagement of crop lying on the ground.

What we claim is:

1. A raking member of the wheel type comprising a hub portion and a rim portion operatively associated with said hub portion, raking teeth extending from said rim at uniformly spaced points therearound, said teeth being arranged in groups, the terminal portions of each group lying in planes which are at acute angles to the plane of the wheel.

2. A member as claimed in claim 1 wherein the rim portion is a circular member.

3. A member as claimed in claim 1 wherein the rim portion comprises spaced sections and means connecting said sections.

4. A member as claimed in claim 1 wherein the rim portion comprises a circular member and strips on and obliquely extending from the circular member, the strips supporting said teeth.

5. A member as claimed in claim 1 wherein adjacent groups define passages oblique to the plane of rotation of said wheel.

6. A member as claimed in claim 1 wherein the wheel has a plane of rotation, said teeth extending from said rim portion at uniformly spaced points considered at said plane.

7. A member as claimed in claim 1 wherein the groups define passages oblique to said wheel, the minimum widths of the passages at the outer extremities of said teeth being greater than the average distance between the outer extremities of adjacent teeth.

8. A member as claimed in claim 1 wherein each group includes at least three teeth.

9. A member as claimed in claim 1 comprising resilient spokes between the rim and hub portions.

10. A member as claimed in claim 1 wherein the teeth at said rim portion are coplanar.

References Cited in the file of this patent

UNITED STATES PATENTS

| | | |
|---|---|---|
| 1,358,481 | Traphagen | Nov. 9, 1920 |
| 2,459,961 | Pollard | Jan. 25, 1949 |
| 2,532,652 | Wray | Dec. 5, 1950 |
| 2,689,446 | Sorrels | Sept. 21, 1954 |